United States Patent
Abdelilah et al.

(10) Patent No.: US 6,823,004 B1
(45) Date of Patent: Nov. 23, 2004

(54) METHODS, SYSTEMS AND COMPUTER PROGRAM PRODUCTS FOR MONITORING PERFORMANCE OF A MODEM DURING A CONNECTION

(75) Inventors: Youssef Abdelilah, Holly Springs, NC (US); Gordon Taylor Davis, Chapel Hill, NC (US); Jeffrey Haskell Derby, Chapel Hill, NC (US); Ajay Dholakia, Gattikon (CH); Michelle Chan Granholm, Morrisville, NC (US); Dongming Hwang, Cary, NC (US); Fredy D. Neeser, Langnau (CH); Robert John Schule, Cary, NC (US); Malcolm Scott Ware, Raleigh, NC (US); Hua Ye, Durham, NC (US); Charles Robert Young, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,097

(22) Filed: Oct. 29, 1999

(51) Int. Cl.[7] .............................. H04B 1/38; H04B 5/16

(52) U.S. Cl. ..................................................... 375/222

(58) Field of Search .............................. 375/222, 219; 717/130; 714/712; 703/211; 710/20, 63; 379/3

(56) References Cited

U.S. PATENT DOCUMENTS

| 3,557,308 A | 1/1971 | Alexander et al. ......... 178/69.5 |
| 3,622,877 A | 11/1971 | MacDavid et al. ....... 324/73 R |
| 3,683,120 A | 8/1972 | Schenkel ................... 179/15 A |
| 3,729,717 A | 4/1973 | de Koe et al. ........... 340/172.5 |
| 4,112,427 A | 9/1978 | Hofer et al. ................. 340/347 |

(List continued on next page.)

FOREIGN PATENT DOCUMENTS

| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | ........... H04L/27/00 |
| FR | 2 345 019 | 3/1976 | ........... H04L/27/10 |
| WO | WO 96/18261 | 6/1996 | .......... H04M/11/00 |
| WO | WO 98/37657 | 8/1998 | |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).

Fischer, *Signal Mapping for PCM Modems, V–pcm Rapporteur Meeting*, Sunriver, Oregon, USA, , 5 pgs. (Sep. 4–12, 1997).

(List continued on next page.)

*Primary Examiner*—Stephen Chin
*Assistant Examiner*—Curtis Odom
(74) *Attorney, Agent, or Firm*—Scott W. Reid; Myers, Bigel, Sibley & Sojovec, P.A.

(57) ABSTRACT

Methods, systems and computer program products are provided for monitoring performance of a modem which obtain diagnostic data directly from memory associated with the modem's digital signal processor (DSP). A secondary path to the DSP memory is utilized for the monitoring operations so that real time data can be obtained during connection startup procedures and during an active connection. First-in first-out (FIFO) buffers are incorporated in the DSP memory to track state transitions of one or more of the state machines within the modem and various performance data measurements may be obtained directly from the DSP memory responsive to different state transition events. The real time collected data may be stored in a file and provided to a remote location for use in diagnosing customer problems with specific customer line connections. Accordingly, real time monitoring of digital and analog line conditions and modem performance may be utilized to diagnose problems with modems and line connections.

28 Claims, 4 Drawing Sheets

U.S. PATENT DOCUMENTS

| | | | |
|---|---|---|---|
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |
| 4,577,310 A | 3/1986 | Korsky et al. | 370/58 |
| 4,578,796 A | 3/1986 | Charalambous et al. | 375/8 |
| 4,720,861 A | 1/1988 | Bertrand | 381/36 |
| 4,731,816 A | 3/1988 | Hughes-Hartogs | 379/98 |
| 4,756,007 A | 7/1988 | Qureshi et al. | 375/37 |
| 4,760,598 A | 7/1988 | Ferrell | 380/44 |
| 4,797,898 A | 1/1989 | Martinez | 375/7 |
| 4,833,706 A | 5/1989 | Hughes-Hartogs | 379/98 |
| 4,868,863 A | 9/1989 | Hartley et al. | 379/98 |
| 4,884,285 A | 11/1989 | Heynen et al. | 375/25 |
| 4,890,303 A | 12/1989 | Bader | 375/107 |
| 4,890,316 A | 12/1989 | Walsh et al. | 379/98 |
| 4,894,847 A | 1/1990 | Tjahjadi et al. | 375/121 |
| 4,901,333 A | 2/1990 | Hodgkiss | 375/98 |
| 4,943,980 A | 7/1990 | Dobson et al. | 375/42 |
| 4,953,210 A | 8/1990 | McGlynn et al. | 380/48 |
| 4,967,413 A | 10/1990 | Otani | 371/37.4 |
| 4,972,360 A | 11/1990 | Cuckier et al. | 364/724.04 |
| 4,985,902 A | 1/1991 | Gurcan | 375/14 |
| 4,991,169 A | 2/1991 | Davis et al. | 370/77 |
| 4,995,030 A | 2/1991 | Helf | 370/32.1 |
| 5,005,144 A | 4/1991 | Nakajima et al. | 364/565 |
| 5,007,047 A | 4/1991 | Sridhar et al. | 370/32.1 |
| 5,014,299 A | 5/1991 | Klupt et al. | 379/98 |
| 5,033,062 A | 7/1991 | Morrow et al. | 375/7 |
| 5,038,365 A | 8/1991 | Belloc et al. | 375/8 |
| 5,040,190 A | 8/1991 | Smith et al. | 375/4 |
| 5,052,000 A | 9/1991 | Wang et al. | 371/43 |
| 5,058,134 A | 10/1991 | Chevillat et al. | 375/39 |
| 5,065,410 A | 11/1991 | Yoshida et al. | 375/98 |
| 5,067,125 A | 11/1991 | Tsuchida | 370/79 |
| 5,068,875 A | 11/1991 | Quintin | 375/78 |
| 5,107,520 A | 4/1992 | Karam et al. | 375/60 |
| 5,111,481 A | 5/1992 | Chen et al. | 375/14 |
| 5,119,401 A | 6/1992 | Tsujimoto | 375/14 |
| 5,119,403 A | 6/1992 | Krishnan | 375/39 |
| 5,134,611 A | 7/1992 | Steinka et al. | 370/79 |
| 5,142,552 A | 8/1992 | Tzeng et al. | 375/14 |
| 5,157,690 A | 10/1992 | Buttle | 375/14 |
| 5,187,732 A | 2/1993 | Suzuki | 379/5 |
| 5,210,755 A | 5/1993 | Nagler et al. | 370/108 |
| 5,225,997 A | 7/1993 | Lederer et al. | 364/550 |
| 5,253,272 A | 10/1993 | Jaeger et al. | 375/60 |
| 5,253,291 A | 10/1993 | Naseer et al. | 379/406 |
| 5,265,151 A | 11/1993 | Goldstein | 379/97 |
| 5,285,474 A | 2/1994 | Chow et al. | 375/13 |
| 5,291,479 A | 3/1994 | Vaziri et al. | 370/58.2 |
| 5,311,578 A | 5/1994 | Bremer et al. | 379/97 |
| 5,317,594 A | 5/1994 | Goldstein | 375/8 |
| 5,351,134 A | 9/1994 | Yaguchi et al. | 358/435 |
| 5,353,280 A | 10/1994 | Ungerböck | 370/32.1 |
| 5,386,438 A | 1/1995 | England | 375/121 |
| 5,394,110 A | 2/1995 | Mizoguchi | 329/304 |
| 5,394,437 A | 2/1995 | Ayanoglu et al. | 375/222 |
| 5,398,303 A | 3/1995 | Tanaka | 395/51 |
| 5,402,445 A | 3/1995 | Matsuura | 375/229 |
| 5,406,583 A | 4/1995 | Dagdeviren | 375/5 |
| 5,418,842 A | 5/1995 | Cooper | 379/98 |
| 5,432,794 A | 7/1995 | Yaguchi | 371/5.5 |
| 5,434,884 A | 7/1995 | Rushing et al. | 375/235 |
| 5,475,711 A | 12/1995 | Betts et al. | 375/240 |
| 5,491,720 A | 2/1996 | Davis et al. | 375/222 |
| 5,513,216 A | 4/1996 | Gadot et al. | 375/233 |
| 5,519,703 A | 5/1996 | Chauffour et al. | 370/84 |
| 5,528,625 A | 6/1996 | Ayanoglu et al. | 375/222 |
| 5,528,679 A | 6/1996 | Taarud | 379/34 |
| 5,533,048 A | 7/1996 | Dolan | 375/222 |
| 5,534,913 A | 7/1996 | Majeti et al. | 348/7 |
| 5,546,395 A | 8/1996 | Sharma et al. | 370/84 |
| 5,563,908 A | 10/1996 | Kaku et al. | 375/222 |
| 5,566,211 A | 10/1996 | Choi | 375/332 |
| 5,598,401 A | 1/1997 | Blackwell et al. | 379/94 |
| 5,625,643 A | 4/1997 | Kaku et al. | 375/222 |
| 5,634,022 A | 5/1997 | Crouse et al. | 395/704 |
| 5,640,387 A | 6/1997 | Takahashi et al. | 370/359 |
| 5,646,958 A | 7/1997 | Tsujimoto | 375/233 |
| 5,671,250 A | 9/1997 | Bremer et al. | 375/222 |
| 5,694,420 A | 12/1997 | Ohki et al. | 375/222 |
| 5,710,792 A | 1/1998 | Fukawa et al. | 375/229 |
| 5,724,393 A | 3/1998 | Dagdeviren | 375/296 |
| 5,726,765 A | 3/1998 | Yoshida et al. | 358/412 |
| 5,729,226 A | 3/1998 | Betts et al. | 341/94 |
| 5,732,104 A | 3/1998 | Brown et al. | 375/222 |
| 5,734,663 A | 3/1998 | Eggenberger | 371/39.1 |
| 5,751,717 A | 5/1998 | Babu et al. | 370/466 |
| 5,751,796 A | 5/1998 | Scott et al. | 379/93.31 |
| 5,754,594 A | 5/1998 | Betts et al. | 375/285 |
| 5,757,849 A | 5/1998 | Gelblum et al. | 375/222 |
| 5,757,865 A | 5/1998 | Kaku et al. | 375/344 |
| 5,761,247 A | 6/1998 | Betts et al. | 375/316 |
| 5,768,311 A | 6/1998 | Betts et al. | 375/222 |
| 5,778,024 A | 7/1998 | McDonough | 375/216 |
| 5,784,377 A | 7/1998 | Baydar et al. | 370/463 |
| 5,784,405 A | 7/1998 | Betts et al. | 375/222 |
| 5,784,415 A | 7/1998 | Chevillat et al. | 375/341 |
| 5,793,809 A | 8/1998 | Holmquist | 375/242 |
| 5,796,808 A | 8/1998 | Scott et al. | 379/93.31 |
| 5,801,695 A | 9/1998 | Townshend | 375/340 |
| 5,805,669 A | 9/1998 | Bingel et al. | 379/28 |
| 5,809,075 A | 9/1998 | Townshend | 375/254 |
| 5,812,537 A | 9/1998 | Betts et al. | 370/286 |
| 5,815,534 A | 9/1998 | Glass | 375/326 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,831,561 A | 11/1998 | Cai et al. | 341/106 |
| 5,835,532 A | 11/1998 | Strolle et al. | 375/233 |
| 5,835,538 A | 11/1998 | Townshend | 375/295 |
| 5,838,724 A | 11/1998 | Cole et al. | 375/222 |
| 5,839,053 A | 11/1998 | Bosch et al. | 455/13.1 |
| 5,844,940 A | 12/1998 | Goodson et al. | 375/222 |
| 5,850,388 A | 12/1998 | Anderson et al. | 370/252 |
| 5,850,421 A | 12/1998 | Misra et al. | 375/354 |
| 5,852,630 A * | 12/1998 | Langberg et al. | 375/219 |
| 5,852,631 A | 12/1998 | Scott | 375/222 |
| 5,862,141 A | 1/1999 | Trotter | 370/468 |
| 5,862,179 A | 1/1999 | Goldstein et al. | 375/242 |
| 5,862,184 A | 1/1999 | Goldstein et al. | 375/295 |
| 5,870,429 A | 2/1999 | Moran, III et al. | 375/222 |
| 5,872,817 A | 2/1999 | Wei | 375/341 |
| 5,881,066 A | 3/1999 | Lepitre | 371/20.5 |
| 5,881,102 A | 3/1999 | Samson | 375/222 |
| 5,887,027 A | 3/1999 | Cohen et al. | 375/222 |
| 5,911,115 A | 6/1999 | Nair et al. | 455/63 |
| 5,914,982 A | 6/1999 | Bjarnason et al. | 375/222 |
| 5,918,204 A | 6/1999 | Tsurumaru | 704/214 |
| 5,926,506 A | 7/1999 | Berthold et al. | 375/222 |
| 6,108,720 A * | 8/2000 | Tal et al. | 370/282 |
| 6,272,452 B1 * | 8/2001 | Wu et al. | 703/24 |
| 6,404,804 B1 * | 6/2002 | Mannering et al. | 375/222 |
| 6,434,161 B1 * | 8/2002 | Higbee et al. | 370/413 |

OTHER PUBLICATIONS

Gardner, *Interpolation in Digital Modems—Part I: Fundamentals*, IEEE Transactions on Communications, vol. 41, No. 3, pp. 501–507 (Mar. 1993).

Humblet et al., *The Information Driveway,* IEEE Communications Magazine, pp. 64–68 (Dec. 1996).

Kalet et al., *The Capacity of PCM Voiceband Channels,* IEEE International Conference on Communications '93, pp. 507–511 (Geneva, Switzerland, May 23–26, 1993).

Mueller et al., *Timing Recovery in Digital Synchronous Data Receiver,* IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange,* Japan Radio Co., Ltd., pp. 69–73 (Japan).

Pahlavan et al., *Nonlinear Quantization and the Design of Coded and Uncoded Signal Constellations,* IEEE Transactions on Communications, vol. 39, No. 8, pp. 1207–1215 (Aug. 1991).

Proakis, *Digital Signaling Over a Channel with Intersymbol Interference,* Digital Communications, pp. 373, 381, (McGraw–Hill Book Company, 1983).

Williams et al., *Counteracting the Quantisation Noise from PCM Codecs,* BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream, ITU–T V.90* (Sep. 1998).

*Series V: Data Communication Over the Telephone Network: Interfaces and voiceband modems: A modem operating at data signalling rates of up to 33 600 bit/s for use on the general switched telephone network and on leased point–to–point 2–wire telephone type circuits, ITU–T V.34* (10/96).

Bell, R.A., et al., *Automatic Speed Reduction and Switched Network Back–up,* IBM Technical Disclosure Bulletin, vol. 32, No. 1, pp. 154–157 (Jun. 1989).

Abbiate, J.C., et al, *Variable–Data Transmission Modem,* IBM Technical Disclosure Bulletin, vol. 17, No. 11, pp. 3301–3302 (Apr. 1975).

*Data Communication Over the Telephone Network: Procedures for Starting Sessions of Data Transmission Over the General Switched Telephone Network, ITU–T V.8* (09/94).

*Line Quality Monitoring Method,* IBM Technical Disclosure Bulletin, vol. 18, No. 8, pp. 2726–2726 (Jan. 1976).

*Loopback Tests for V.54 Data Communication Equipment,* IBM Technical Dislosure Bulletin, vol. 32, No. 3A, pp. 295–299 (Aug. 1989).

*On–Line Real Time Modem Testing,* IBM Technical Disclosure Bulletin, vol. 20, No. 6, pp. 2252–2254 (Nov. 1977).

Pierobon, Gianfranco L., *Codes of Zero Spectral Density at Zero Frequency,* IEEE Transactions on Information Theory, vol. IT–30, No. 2, pp. 435–439 (Mar., 1984).

Marcus, Brian H, et al., *On Codes with Spectral Nulls at Rational Submultiples of the Symbol Frequency,* IEEE Transactions on Information Theory, vol. IT–33, No. 4, pp. 557–568 (Jul. 1987).

Fischer, Robert, et al., *Signal Mapping for PCM Modems,* ITU–Telecommunications Standardization Sector PCM '97–120, V.pcm Rapporteur Meeting, (Sunriver, Oregon: Sep. 4–12, 1997).

*Pulse Code Modulation (PCM) of Voice Frequencies, ITU–T,* Recommendation G.711 (Geneva, 1972).

*Data Communication Over the Telephone Network; Error–Correcting Procedures for DCEs Using Asynchronous–to––Synchronous Conversion, ITU–T–V.42* (03/93).

*Improvement to Spectral Shaping Technique,* Research Disclosure, v. 41, n415, 415111, pp. 1550–1551 (Nov. 1998).

*TIA Standard Draft: North American Telephone Network Transmission Model for Evaluating Analog Client to Digitally Connected Server Modems,* Telecommunications Industry Association, PN3857, Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication in Noisy Communication Line Environments,* IBM Technical Disclosure Bulletin, vol. 24, No. 9, pp. 4627–4629 (Feb. 1982).

Godard, D., et al., *Decision Feedback Equalizer Stabilization in Adaptive Mode,* IBM Technical Disclosure Bulletin, vol. 24, No. 11A, pp. 5691–5692 (Apr. 1982).

Borgnis–Desbordes, P., et al., *Variable–Speed Data Transmission,* IBM Technical Disclosure Bulletin, vol. 27, No. 4A, pp. 2269–2270 (Sep. 1984).

Couland, G., et al., *Analog Wrap Self–Test in Modems During Retrain Operations,* IBM Technical Disclosure Bulletin, vol. 28, No. 6, p. 2457 (Nov. 1985).

Maddens, F., *Sixteen–State Forward Convolutional Encoder,* IBM Technical Disclosure Bulletin, vol. 28, No. 6, pp. 2466–2468 (Nov. 1985).

*Remote Modem–Type Self–Learning,* IBM Technical Disclosure Bulletin, vol 28, No. 6, pp. 2398–2399 (Nov. 1985).

Maddens, F., *Sixteen–State Feedback Convolutional Encoder,* IBM Technical Disclosure Bulletin, vol. 28, No. 10, pp. 4212–4213 (Mar. 1986).

Nobakht, R.A., *Trellis–Coded Modulation Coding Scheme for a 19/2 Kbps Modem,* IBM Technical Disclosure Bulletin, vol. 36, No. 11, pp. 167–170 (Nov. 1993).

Nobakht, R.A., *Unified Table Based Subset Decoder for the Viterbi Algorithm,* IBM Technical Disclosure Bulletin, vol. 37, No. 9, pp. 581–587 (Sep. 1994).

Nobakht, R.A., *Trellis Subset Decoder Algorithm Based on a Pattern Recognition Scheme,* IBM Technical Disclosure Bulletin, vol. 37, No. 10, pp. 693–697 (Oct. 1994).

Barlet, J., et al., *Full Speed Recovery in High Speed Modems,* IBM Technical Disclosure Bulletin, vol. 23, No. 2, pp. 641–643 (Jul. 1980).

Dialog Abstract, *Sample rate converter for duplex modem,* European Patent No. 285413.

Dialog Abstract, *Two–speed full–duplex modem for telephone network,* PCT No. WO8501407.

Dialog Abstract, *Digital data transmission system,* European Patent No. 124674.

Dialog Abstract, *Facsimile communication controller,* Japanese Publication No. 04–175060 (Jun. 23, 1992).

Dialog Abstract, *Picture communication equipment,* Japanese Publication No. 03–120954 (May 23, 1991).

Dialog Abstract, *Radio date transmission system,* Japanese Publication No. 01–179535 (Jul. 17 ,1989).

Dialog Abstract, *Facsimile device,* Japanese Publication No. 57–164654 (Oct. 9, 1982).

Dialog Abstract, *Data repeater,* Japanese Publication No. 57–087255 (May 31, 1982).

Dialog Abstract, *Blinding training method for decision feedback equaliser having feed–forward and feedback filters,* European Patent No. 880253.

Dialog Abstract, *Processing method for distorted signal received by qam receiver,* European Patent No. 465851.

Dialog Abstract, *Establishing wireless communication channel,* PCT No. WO 9905820.

Dialog Abstract, *High–speed rate adaptive subscriber line digital data modem,* PCT No. WO 9830001.

Dialog Abstract, *Digital modem in digital modulation system,* Japanese Patent No. 8116341.

Dialog Abstract, *Communication equipment and radio communication adapter,* Japanese Publication No. 08–340289 (Dec. 24, 1996).

Dialog Abstract, *Data recording method,* Japanese Publication No. 05–089597 (Apr. 9, 1993).

Dialog Abstract, *Transmission control system for data communication and its modem equipment,* Japanese Publication No. 02–228853 (Sep. 11, 1990).

Naguib, A.F., et al., Dialog Abstract, *A space–time coding modem for high–data–rate wireless communications,* IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communications,* IEICE Transactions on Communications, vol. E81–B, No. 7, pp. 1453–1461 (Jul. 1998).

Naguib, A.F., et al., Dialog Abstract, *A space–time coding modem for high–data–rate wireless communications,* GLOBECOM 97, IEEE Global Telecommunications Conference, vol. 1, pp. 102–109 (1997).

Kobayashi, K., et al., Dialog Abstract, *Fully digital burst modem for satellite multimedia communication systems,* IEICE Transactions on Communications, vol. E80–B, No. 1, pp. 8–15 (Jan. 1997).

Skellern, D.J., et al., Dialog Abstract, *A high speed wireless LAN,* IEEE Micro, vol. 17, No. 1, pp. 40–47 (Jan.–Feb. 1997).

Enomoto, K. et al., Dialog Abstract, *A mode switching type burst demodulator AFC,* Transactions of the Institute of Electronics, Information and Communication Engineers, vol. J76B–II, No. 5, pp. 415–421 (May 1993).

Betts, W., Dialog Abstract, *Nonlinear encoding by surface projection,* International Conference on Data Transmission—Advances in Modem and ISDN Technology and Applications (Sep. 23–25, 1992).

Schilling, D.L., et al., Dialog Abstract, *The FAVR meteor burst communication experiment,* Military Communications in a Changing World MILCOM '91 (Nov. 4–7, 1991).

Jacobsmeyer, J.M., Dialog Abstract, *Adaptive trellis–coded modulation for bandlimited meteor burst channels,* IEEE Journal on Selected Areas in Communications, vol. 10, No. 3, pp. 550–561 (Apr. 1992).

Sato, T., et al., Dialog Abtsract, *Protocol configuration and verification of an adaptive error control scheme over analog cellular networks,* IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems,* COMSAT Technical Review, pp .195–234 (Fall 1989).

Sato, T., et al., Dialog Abstract, *Error–free high–speed data modem,* Oki Technical Review, vol. 56, No. 133, pp. 20–26 (Apr. 1989).

Seo, J.–S. et al., Dialog Abstract, *Performance of convolutional coded SQAM in hardlimited satellite channels,* IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use,* IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels,* International Conference on Digital Processing of Signals in Communications, pp. 165–172 (United Kingdom, 1985).

Filter, J.H.J., Dialog Abstract, *An algorithm for detecting loss of synchronisation in data transmission test sets (modems),* Transactions of the South African Institute of Electrical Engineers, vol. 76, No. 1, pp. 39–43 (Jan. 1985).

Gersho, A., Dialog Abstract, *Reduced compexity implementation of passband adaptive equlizers,* IEEE Journal on Selected Areas in Communications, vol. SAC–2, No. 5, pp. 778–779 (Sep. 1984).

Dialog Abstract, *High–speed full–duplex modem reduces telephone connect line,* EDN, vol. 27, No. 18, p. 77 (Sep. 15, 1982).

Chadwick, H., et al., Dialog Abstract, *Performance of a TDMA burst modem through a dual nonlinear satellite channel,* Fifth Internaitonal Conference on Digital Satellite Communications, pp. 63–67 (Italy, Mar. 23–26, 1981).

Nussbaumer, H., Dialog Abstract, *Reducing the acqusition time in an automatic equalizer,* IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking,* IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels,* IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightwave transmission systems,* International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission,* Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels,* IEEE Transactions on Communications, vol. 45, No. 3, pp. 376–383 (Mar. 1997).

Umehira, M., et al., Dialog Abstract, *Design and performance of burst carrier recovery using a phase compensated filter,* Transactions of the Institute of Electronics, Information and Communication Engineers, vol. J78B–II, No. 12, pp. 735–746 (Dec. 1995).

De Bot, P., et al., Dialog Abstract, *An example of a multi-resolution digital terrestrial TV modem,* Proceedings of ICC '93—IEEE International Conference on Communications, vol. 3, pp. 1785–1790 (Switzerland, May 23–26, 1993).

Lei, Chen, et al., Dialog Abstract, *Single–tone HF high speed data modem*, Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems*, IEEE Communications, vol. 32, No. 7, pp. 42–53 (Jul. 1994).

Sato, T., et al., Dialog Abstract, *Vehicle terminal equipment with dedicated DSP*, Oki Technical Review, vol. 58, No. 144, pp. 49–52 (Jul. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Tamm, Yu. A., Dialog Abstract, *The effect of suppressing harmonic interference using an adaptive equalizer*, Elektrosvyaz, vol. 45, No. 3, pp. 5–10 (Mach 1990).

Saleh, A.A.M., et al., Dialog Abstract, *An experimental TDMA indoor radio communications systemusing slow frequency hopping and coding*, IEEE Transactions on Communications, vol. 39, No. 1, pp. 152–162 (Jan., 1991).

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles*, Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels*, 38$^{th}$ IEEE Vehicular Technology Conference: 'Telecommunications Freedom—Technology on the Move', pp. 489–496 (Jun. 15–17, 1988).

Dialog Abstract, *1200–bit/s cellular modem DLD03H*, Oki Technical Review, vol. 53, No. 127, pp. 70–72 (Jul. 1987).

Chamberlin, J.W., et al., Dialog Abstract, *Design and field test of a 256–QAM DIV modem*, IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network*, International Journal of Satellite Communications, vol. 3, Nos. 1–2, pp. 145–160 (Jan.Jun. 1985).

Shumate, A., Dialog Abstract, *Error correction coding for channels subject to occasional losses of bit count integrity*, IEEE Military Communications Conference, vol. 1, pp .89–83 (Oct. 21–24, 1984).

Suyderhoud, H., et al., Dialog Abstract, *Investigation of 9.6 kb/s data transmission via a PCM link at 64 kb/s with and without link errors*, International Journal of Satellite Communications, vol. 2, No. 1, pp. 81–87 (Jan.–Mar. 1984).

Smith, C., Dialog Abstract, *Relating the performance of speech processors to the bit error rate*, Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors*, Sixth International Conference on Digital Satellite Communications Proceedings, pp. 26–33 (Sep. 19, 23, 1983).

Kittel, L., Dialog Abstract, *Analogue and discrete channel models for signal transmission in mobile radio*, Frequenz,. vol. 36, Nos. 4–5, pp. 153–160 (Apr.–May 1982).

Farrell, P.G., et al., Dialog Abstract, *Soft–decision error control of h.f. data transmission*, IEE Proceedings F (Communications, Radar and Signal Processing), vol. 127, No. 5, pp. 389–400 (Oct. 1980).

Johnson, A.L., Dialog Abstract, *Simulation and implementation of a modulation system for overcoming ionospheric scintillation fading*, AGARD Conference Proceedings No. 173 on Radio Systems and the Ionosphere, pp. 3/1–5 (Greece, May 26–30, 1975).

Matsumura, K., et al., Dialog Abstract, *Anti–interference data–transmission set of HF radio equipment*, Mitsubishi Electric Engineer, No. 41, pp. 18–23 (Sep., 1974).

Blank, H.A., et al., Dialog Abstract, *A Markov error channel model*, 1973 National Telecommunications Conference, vol. 1, pp. 15B/1–8 (Nov. 26–28, 1973).

McGruther, W.G. Dialog Abstract, *Long term error performance data for operation at 2400 bps ona nonswitched private line network*, Summaries of papers presented at 1970 Canadian symposium on communications, pp. 65–66 (Canada, Nov. 12–13, 1970).

Burton, H.O., et al., Dialog Abstract, *On the use of error statistics from data transmission on telephone facilities to estimate performance of forward–error–correction*, 1970 international conference on communications, p. 21 (Jun. 8–10, 1970).

Bowen, R.R., Dialog Abstract, *Applications on burst error correction codes to data modems for dispersive channels*, Proceedings of the 1970 international symposium on information theory, p. 1 (Netherlands, Jun. 15–19, 1970).

Pierce, A.W., et al., Dialog Abstract, *Effective application of forward–acting error–control coding to multichannel h.f. data modems*, IEEE Transactions on Communication Technology, vol. Com–18, No. 4, pp. 281–294 (Aug. 1970).

West, R.L., Abstract, *Data Concentration Method*, IBM Technical Disclosure Bulletin, pp. 487–489; http://w3.infogate.ibm.com:1207/SESS506884/GETDOC/39/2/1 (Jul., 1975).

Haas, L.C., et al., Abstract, *Received Line Signal Quality Analysis*, IBM Technical Disclosure Bulletin, pp. 5414–5416: http://w3.infogate.ibm.com:1207/SESS506884/GETDOC/43/1/1 (May, 1981).

Nussbaumer, H., Abstract, *Reducing the Acquisition Time in an Automatic Equalizer*, IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system*, PCT No. WO 9310607.

Dialog Abstract, *Reduced time remote access method for modem computer*, PCT No. WO 9209165.

* cited by examiner

METHODS, SYSTEMS AND COMPUTER PROGRAM PRODUCTS FOR MONITORING PERFORMANCE OF A MODEM DURING A CONNECTION

FIELD OF THE INVENTION

The present invention relates generally to the field of modems, and, more particularly, to modem diagnostics.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the public switched telephone network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. The ISDN offers suitable data rates for Internet access, telecommuting, remote education services, and some forms of video conferencing. ISDN deployment, however, has been very slow due to the substantial investment required of network providers for new equipment. Because the ISDN is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). In recent years, local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard.

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions outside of the conversion made at the subscriber's modem to enable transmission at 56 kbps.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. The PCM codewords are modulated using a technique known as pulse amplitude modulation (PAM) in which discrete analog voltage levels are used to represent each of the 256 PCM codewords. These PAM signals are transmitted towards the PSTN by the PAM transmitter 36 where they are received by a network codec. No information is lost in converting the PAM signals back to PCM because the codec is designed to interpret the various voltage levels as corresponding to particular PCM codewords without sampling the PAM signals. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to PAM voltages by the codec expander (digital-to-analog (D/A) converter) 38. These PAM voltages are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed hereinbefore. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either μ-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard only offers increased data rates (e.g., data rates up to 56 kbps) in the downstream direction from a server to a subscriber or client. Upstream communication still takes place at conventional data rates as provided for in the V.34 standard. Nevertheless, this asymmetry is particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists of mainly keystroke and mouse commands, which are readily handled by the conventional rates provided by the V.34 standard.

The V.90 standard, therefore, provides a framework for transmitting data at rates up to 56 kbps provided the network is capable of supporting the higher rates. The most notable requirement is that there can be at most one digital-to-analog conversion in the path from the server modem to the client modem. Nevertheless, other digital impairments, such as robbed bit signaling (RBS) and digital mapping through PADs, which results in attenuated signals, can also inhibit transmission at V.90 rates. Communication channels exhibiting non-linear frequency response characteristics are yet another impediment to transmission at the V.90 rates. These factors may limit conventional V.90 performance to less than the 56 kbps theoretical data rate.

Articles such as Humblet et al., "The Information Driveway," IEEE Communications Magazine, December 1996, pp. 64–68, Kalet et al., "The Capacity of PCM Voiceband Channels," IEEE International Conference on Communications '93, May 23–26, 1993, Geneva, Switzerland, pp. 507–511, Fischer et al., "Signal Mapping for PCM Modems," V-pcm Rapporteur Meeting, Sunriver, Oreg., USA, Sep. 4–12, 1997, and Proakis, "Digital Signaling Over a Channel with Intersymbol Interference," Digital Communications, McGraw-Hill Book Company, 1983, pp. 373, 381, provide general background information on digital communication systems.

As modem performance specifications push ever closer to the limits supported by the physical media, the potential for user dissatisfaction with modem performance under various line conditions increases. For example, it is not uncommon for 56 k modem users to experience significantly lower connection speeds or throughput than they may expect in light of the 56 k capability associated with the modems. Users may not appreciate that, while manufacturers of such modems often quote 53.3 kbps as a maximum speed, they also typically note that line conditions may result in even lower speeds. Unfortunately, manufacturers currently have generally not effectively explained why a given customer's modem may be operating at a particular speed or throughput. Furthermore, manufacturers are not readily able to explain why a given customer may encounter an inability to make a connection or experience dropped connections.

One known approach to evaluating modem performance is the use of AT commands, such as those provided for by operating systems, such as Windows™ from Microsoft Corporation, for communicating with a modem (such as the #UD command). However, only a limited amount of diagnostic information may be obtained from a modem using this approach. Furthermore, the modem communication session typically must be terminated to obtain information using AT commands, which not only interrupts ongoing operations but further may limit the amount and types of data available from the modem, (for example, due to retraining procedures overwriting various data within the modem). For example, an interface like Hyperterm™ may be used to enter AT commands which would preclude the use of such commands while the modem was in use by a user application, such as Dial-up Networking, as the Hyperterm™ application would establish any client modem to server modem connection. A further approach, as described in U.S. Pat. No. 5,634,022 entitled "Multi-Media Computer Diagnostic System" provides for insertion of branch instructions into the operating code of a signal processing device transferring operations to a diagnostic program. However, this approach is directed to discovery and correction of algorithmic or logical faults and may not be well suited to line condition monitoring. Accordingly, a need exists to obtain knowledge of customer specific line conditions and potential interworking problems between a customer's client modem and a server modem to address customer support problems.

SUMMARY OF THE INVENTION

It is an object of the present invention to provide methods, systems and computer program products for monitoring performance of a modem which may be able to obtain data in real time.

It is a further object of the present invention to provide such methods, systems and computer program products which may provide obtained performance data to a provider for use in addressing customer support problems.

These and other objects, advantages, and features of the present invention may be provided by methods, systems and computer program products for monitoring performance of a modem which obtain diagnostic data directly from a memory associated with the modem's digital signal processor (DSP). A secondary path to the DSP memory is utilized for the monitoring operations so that real time data can be obtained during connection procedures and during an active connection. First-in first-out (FIFO) buffers are preferably incorporated in the DSP memory to track state transitions of one or more of the state machines within the modem and various performance data measurements may be obtained directly from the DSP memory responsive to different state transition events. The real time collected data may be stored in a file and provided to a remote location for use in diagnosing customer problems with specific customer line connections. Accordingly, real time monitoring of digital and analog line conditions and modem performance may be utilized to diagnose problems with modems and line connections.

In one embodiment of the present invention, a method is provided for monitoring performance of a modem including obtaining data related to the performance of the modem from a memory of the modem during an active connection to the modem asynchronously with communication operations of the modem supporting the active connection. Preferably, the data related to the performance of the modem is obtained from a digital signal processor (DSP) memory using a secondary path to the DSP memory. The data may be obtained during startup of the active connection. The data further may be selected from the group consisting of line condition data and interworking data.

In a further embodiment of the present invention, the data related to the performance of the modem includes internal state information and obtaining operations include determining that a state transition has occurred based on the internal state information and capturing a selected type of data related to the performance of the modem responsive to a state transition. Furthermore, the modem may include a plurality of state machines each state machine having a plurality of associated states in which case determining operations may further include determining that a state transition of one of the plurality of state machines has occurred based on detecting a change from one of the plurality of associated states of the one of the plurality of state machines to another of the plurality of associated states of the one of the plurality of state machines and the selected type of data may be selected based on the one of the plurality of state machines. The selected type of data may further be selected based on the one of the plurality of associated states and the another of the plurality of associated states.

In another embodiment of the present invention, a first-in first-out (FIFO) buffer is provided in the DSP memory and determining operations further include placing the internal state information in the FIFO buffer. A plurality of FIFO buffers may be provided in the DSP memory, each of the plurality of FIFO buffers being associated with a different state machine of the modem and internal state information associated with a respective state machine of the modem may be placed in a corresponding one of the plurality of FIFO buffers.

In a further embodiment of the present invention, the date related to the performance of the modem is stored in a text file. The stored data may then be provided to a remote location for analysis.

In another aspect of the present invention, a system is provided for monitoring performance of a modem. The system includes a host system having a host system bus. The monitoring system further includes a modem. The modem includes a digital signal processor (DSP) and a memory coupled to the DSP over a DSP system bus. In addition, the modem also includes a primary path to the DSP memory that supports a communication connection. A bus interface couples the host system bus to the DSP system bus, the bus interface being configured to allow the host system to access the DSP memory to obtain data related to performance of the modem during an active communication session supported by the primary path of the modem asynchronously with communication operations of the modem supporting the active communication session. In one embodiment, the modem further includes a first-in first-out (FIFO) buffer coupled to the DSP and the DSP is configured to place internal state information associated with state machines of the modem in the FIFO buffer. Furthermore, the modem may include a plurality of first-in first-out (FIFO) buffers, each of the FIFO buffers being associated with one of a plurality of state machines of the modem and the DSP may be configured to place internal state information associated with the plurality of state machines in a corresponding one of the FIFO buffers.

As will further be appreciated by those of skill in the art, while described above primarily with reference to method aspects, the present invention may be embodied as methods, apparatus/systems and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a system, or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention is typically written in a high level programming language such as C or C++. Nevertheless, some modules or routines may be written in assembly or machine language to optimize speed, memory usage, or layout of the software or firmware in memory. Assembly language is typically used to implement time-critical code segments.

Figure 1:
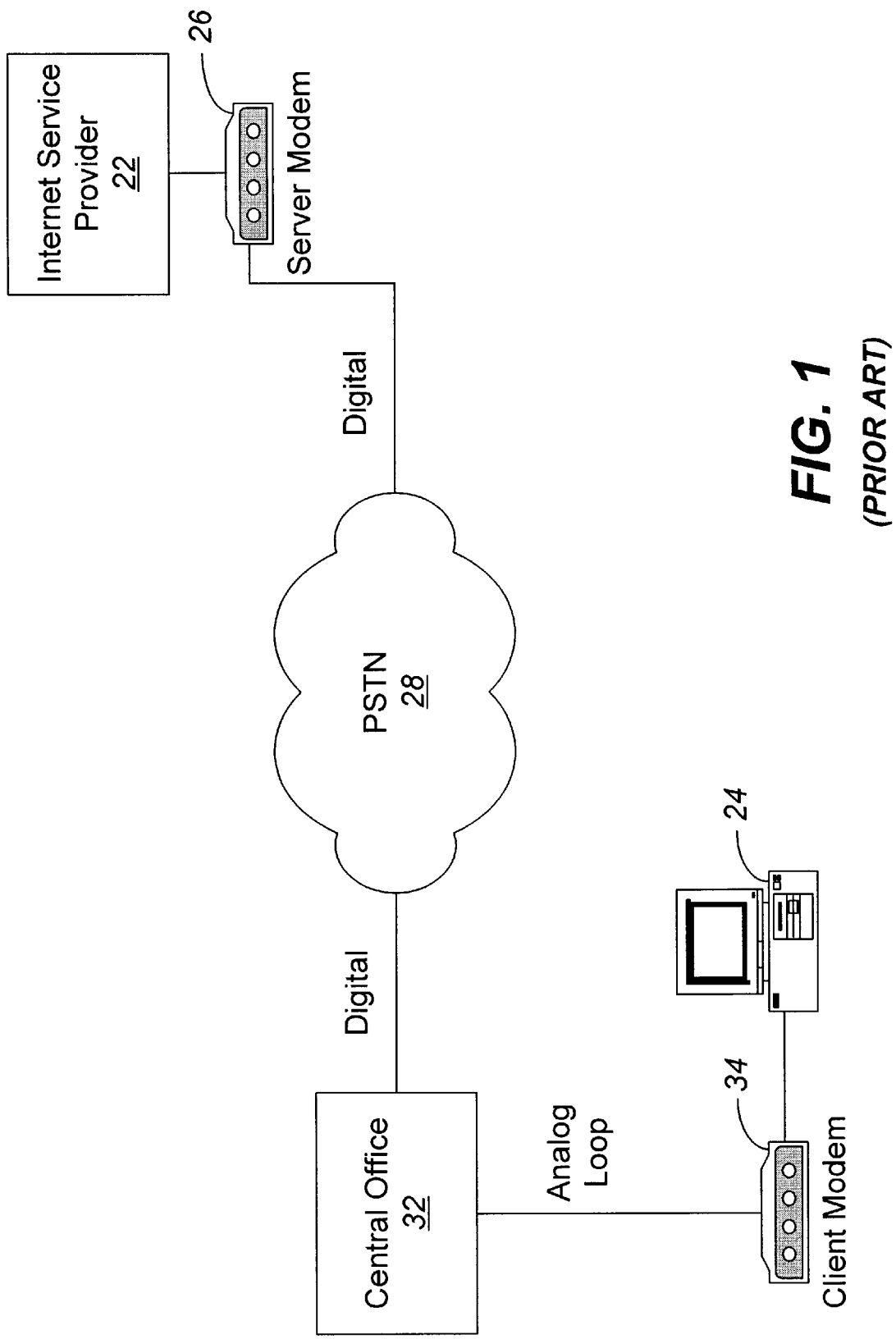
FIG. 1 is block diagram illustrating a typical V.90 connection between a subscriber and an ISP in accordance with the prior art.
Figure 2:
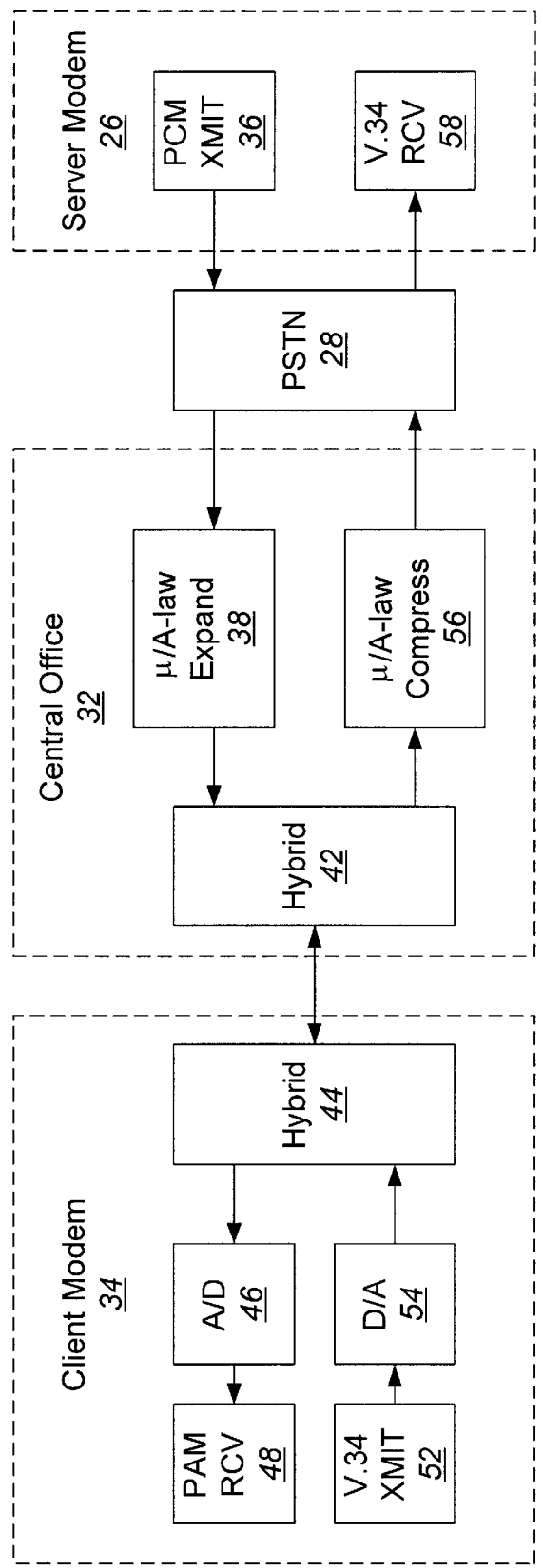
FIG. 2 is a detailed block diagram of the internal architecture and connections between the client modem, the central office, and the server modem of FIG. 1.
Figure 3:
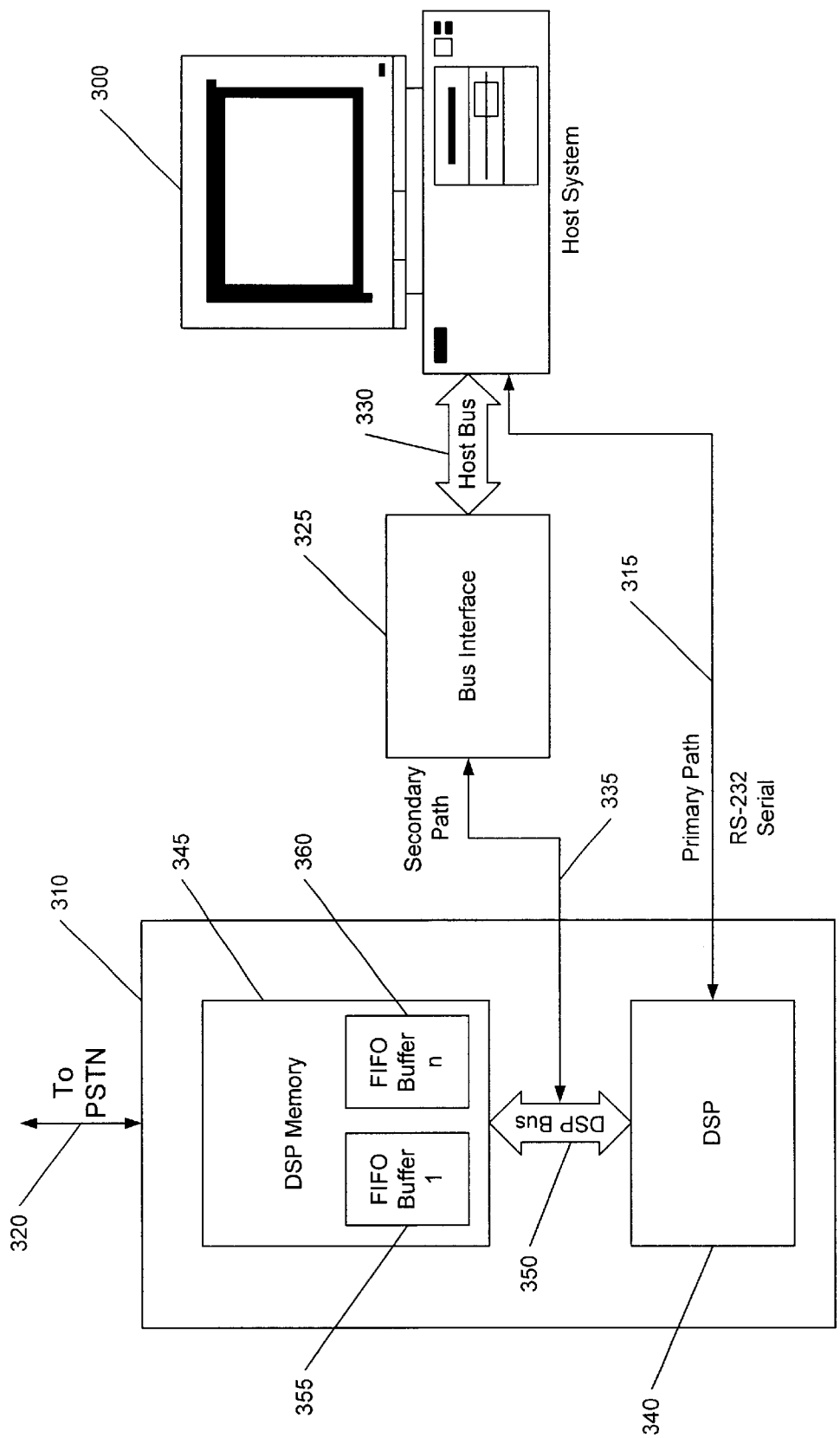
FIG. 3 is a block diagram of a modem performance monitoring system in accordance with the present invention.

The present invention will now be further described with reference to the block diagram illustration of an embodiment of a system for monitoring performance of a modem of FIG. 3. As shown in the embodiment of FIG. 3, the host system 300 is connected to a modem 310, such as a V.90 protocol modem. While the modem 310 is illustrated in FIG. 3 as being separate from the host system 300, it is to be understood that, in the preferred embodiment of the present invention, the modem 310 is an internal modem device contained within the host system 300. An example of such a host system including a modem which may be modified for use according to the teachings of the present invention is the ACP modem available with the Think Pad™ Laptop computer available from International Business Machines Corporation (IBM).

The host system 300 is coupled to the modem 310 through a primary path 315 which supports communication services utilizing the modem 310. More particularly, communications from applications executed on the host system 300 are conveyed on the primary path 315 to the modem 310 for transmission through the port 320 which, in the illustrated embodiment, provides a connection to the Public Switched Telephone Network (PSTN). Similarly, communications from a remote device by a server modem (not shown) are received from the PSTN through port 320 and provided to a destination application executing on the host system 300 by the modem 310. The primary path 315 may be a serial link such as an RS-232 connection. It is further to be understood that the port 320 may connect to other networks including wireless networks or a broadband network. It is to be understood that when connected with a wireless network the modem 310 may be a wireless modem. Similarly, when connected with a broadband network, the modem 310 may be a cable modem, an Asymmetric Digital Subscriber Line (ADSL), a Symmetric Digital Subscriber Line (SDSL), a High Speed Digital Subscriber Line (HDSL) or a Very High Speed Digital Subscriber Line (VDSL).

As further shown in the embodiment of FIG. 3, the modem 310 includes a digital signal processor (DSP) 340 and an associated DSP memory 345. The DSP 340 is coupled to the DSP memory 345 over the DSP system bus 350. As used herein, references to the DSP memory 345 associated with the DSP 340 refer to the memory or memories within the modem 310 which are utilized for data storage by the DSP 340 during communication operations of the modem 310 supporting an active connection. This memory may include a separate memory device coupled to the DSP 340 over the DSP bus 350 and may further include memory which is contained within the circuit device of DSP 340 which is nonetheless available over the DSP system bus 350. There also may be a multitude of DSPs being monitored if more than over DSP is used to implement the modem as, for example, with some broadband and wireless modems.

The DSP memory 345 further includes one or more first-in first-out (FIFO) buffers 355, 360. The FIFO buffers 355, 360 implemented in the DSP memory 345 are used to record state transitions made for one or more of the state machines of the modem 310 as will be described further later herein. As used herein, the term "FIFO buffer" includes both circular buffers and other types of FIFO buffers.

The host system 300 is further connected to the modem 310 through the bus interface 325 as shown in the embodiment of FIG. 3. A secondary path 335 is thereby provided for accessing the DSP memory 345 through the DSP system bus 350 by the bus interface 325 as will be described further later herein. The primary path 315 is used to support a communication connection by the modem 310 while the secondary path 335 through the bus interface 325 allows the host system 300 to access the DSP memory 345 to obtain data related to performance of the modem 310 during an active communication session supported by the primary path 315 to the modem 310. More particularly, the bus interface 325 provides a connection from the host system bus 330 of the host system 300 to the DSP system bus 350 of the modem 310. A secondary path 335 can also be provided through other means, for example, to provide for implementation of the systems and methods of the present invention where external modems are used to support the host system 300. For example, as will be understood by those of skill in the art, the host system bus 330 may be coupled to an external communication port, such as a serial port or a parallel port, which provides a separate cabled link to an external modem allowing a secondary path of communication and access to the external modem while the primary coupling to the external modem is used to support a communication connection. However, it is preferred that an embodiment such as that illustrated in FIG. 3 be utilized as a direct connection between the host bus 330 and the DSP system bus 350 utilizing the bus interface 325 is expected to provide superior performance characteristics to those which would be expected using an external communicational link. Accordingly, in preferred embodiments of the present invention, modem performance is monitored by a host system 300 containing an internal modem 310. Nonetheless, the benefits of the present invention may also be obtained in various other embodiments including those in which the secondary path 335 does not return to the same host as the primary path 315. A second host may be co-located or remote from the first host. In fact, a remote second host could be at a distant location monitoring a modem connection through the secondary path 335.

The DSP 340 is coupled to the FIFO buffers 355, 360 and is configured to place internal state information associated with state machines of the modem 310 in the FIFO buffers 355, 360. Each of the FIFO buffers 355, 360 may be associated with a selected one of a plurality of state machines of the modem 310 and the DSP 350 is configured to place internal state information associated with the plurality of state machines in a corresponding one of the FIFO buffers 355, 360. Alternatively, a single FIFO buffer may be provided for all state machines of the modem 310 and a state tag may be provided to identify the associated state machine for each transition record in the FIFO buffer. Accordingly, the host system 300 coupled through the bus interface 325 to the DSP system bus 350 and accessing the DSP memory 345 including the FIFO buffers 355, 360 provides a means for obtaining data related to the performance of the modem 310 from the DSP memory 345 during an active connection to the modem 310 asynchronously with communication operations of the modem 310 supporting the active connection. As used herein, the term "asynchronously" in this context means that memory access operations to read data from the DSP memory 345 and the FIFO buffers 355, 360 to monitor performance occur independently from operations of the active connection. For example, the memory reads in a preferred embodiment are performed by a data acquisition module executing on the host system 300 independent of the code executed by the DSP 340 that supports the active communication connection through the modem 310. More particularly, an application, such as a Windows™ application, may be executed on a host system 300, such as an IBM Think Pad mobile computer, to record performance data obtained according to the present invention. Accordingly, improved diagnostic capabilities may be provided through the ability to access the DSP memory 345 while the modem 310 is in operation and without interfering with or interrupting data flow over the primary path 315 to the modem 310.

Performance information so obtained may include a variety of information including the time of day, phone number dialed, call setup return codes (CSR CODE) such as those available on Microsoft Corporation's AT code #UD (UniModem diagnostic command specification), multi-phase startup procedure information such as phase 1 negotiation parameters (pursuant, for example, in a V.90 modem, to the V.8 protocol), phase 2 through 4 errors, transmit and receive speeds, retrains, disconnect errors, phone line characteristics, connecting modem brand information, power levels, and other protocol specific information. For example, with reference to a V.90 protocol, protocol specific information may include digital discontinuity impairments, equalizer coefficients, echo canceller coefficients, PADs and RBS (Rob Bit Signaling) intervals, non-linear distortion measurements and other information which will be known to those of skill in the art and as further described in the standards for modem communication, such as the V.90 standard from the ITU. This type of information may be obtained and stored by the host system 300 and subsequently used for activities, such as characterizing the telephone network to which the port 320 is coupled, including individual line conditions and other characteristics, which could be a source of complaints from modem users. The acquired data may further be utilized to analyze the capability of a particular user connection and/or to determine if a connection exhibits digital discontinuity which, for example, would typically force a V.90 modem to fall back to V.34 standard operations. Accordingly, it is to be understood that, while operations will be described herein primarily with reference to a V.90 standard, the present invention may be applied beneficially to a variety of different modem types, including both voice band and broadband communication modems, as will be known to those of skill in the art. It is further to be understood, however, that the teachings of the present invention are particularly directed to environments in which both a primary path and a secondary path are available to the DSP memory 345 to provide for monitoring operations to occur in real time while a communication connection is active through the modem.

As is evident from the types of information identified above which may be monitored according to the present invention, a significant amount of performance information can be tracked during a communication connection, for example, on a minute-by-minute basis or responsive to detection of the occurrence of certain events. The monitoring system of the present invention may be utilized to monitor internal states of the modem 310 or state transitions of one or more state machines implemented within the modem 310 and to selectively record specified parameters out of the total set of parameters available within the DSP memory 345 during state conditions where the selected parameters are significant or of potential interest to a diagnostic user. Accordingly, the types of information obtained may not only be triggered by a state transition but may further vary depending upon the state into which the respective state machine of the modem 310 has transitioned. Information may be collected on a real time basis and recorded during the life of a connection. Furthermore, information about disconnects may be gathered and throughput for a connection can be estimated.

In addition, data may also be collected when a connection is being attempted, in other words, during the startup phases before a connection is in use for data communication. Such data during startup may be especially useful when diagnosing "failure to connect" problems. Furthermore, as performance information may be collected on a real-time basis during a connection, pertinent data may be preserved which might otherwise be lost as a result of an event causing diagnostic data in the DSP memory 345 to be overwritten (for example, during retrains). The performance data may be recorded while the user of the client modem 310 is actively connected to a remote server modem in a normal manner such as through a service provider end user application (e.g. AOL, IGN Dialer and Windows Dial-up Networking) executing on the host system 300. Performance data may be obtained throughout the active connection operations including both the startup phases and during data communication as well as the disconnect procedures. Accordingly, as used herein, the term "active connection" is intended to encompass not only the data communication portion of a connection but also the startup phases of operation implemented through the modem 310 and the corresponding disconnect phases.

A further advantage provided by the systems, methods and computer program products of the present invention is that the data collection techniques may be utilized to obtain performance data which is specific for each user connection. The state variables and other performance information collected may be unique for a particular situation, in other words, state variables may be collected for each specific client modem to server modem pair for a given point to point connection. Accordingly, when user complaints are received, state variables and other performance data may be provided for analysis of the conditions leading to the user complaint.

Utilization of the FIFO buffers 355, 360, such as in the illustrated embodiment of FIG. 3, provides further advantages in monitoring performance data. The use of FIFO buffers 355, 360 may allow the performance monitoring application executing on the host system 300 to capture every state transition for the various state machines within the modem 310 even when access latency in reading the DSP memory 345 is longer than the duration of some states. In addition, time critical transient data may also be placed in the FIFO buffers 355, 360 and further may be only conditionally stored based on specific state transitions within the modem 310. Furthermore, other performance parameter data which is not as transient may also be conditionally traced on specific state transitions within the modem 310 by reading the parameters directly from the DSP memory 345 without the use of the FIFO buffers 355, 360. Finally, additional FIFO buffers could be implemented within the DSP memory 345 for use in maintaining highly transient performance data in addition to the FIFO buffers 355, 360 which are associated with various state machines of the modem 310 and are used for tracking state transitions.

A particular example of a type of performance data which may be obtained by utilization of the present invention is impairment data such as that specified in the TIA PN 3857 draft 10 specification entitled "North American Telephone Network Transmission Model for Evaluating Analog Client to Digitally Connected Server Modems." Various impairments which may be wholly or fully monitored according to the teachings of the present invention in the context of a V.90 modem are found in Table 2-A of the TIA TN 3857 draft 10 document. Further, in Table 1 below, the various types of impairments from the draft 10 document and an embodiment of monitoring of the various impairments according to the present invention are provided:

combinations into the measured frequency response of the line probing sequence contained in phase 2 of V.90 modem startup protocol. This information may be useful, for example, in cases where a V.90 modem falls back to V.34 operation due to digital discontinuity or an excessively long local loop.

Operations according to an embodiment of the present invention will now be described with reference to the flow chart illustration of FIG. 4. Operations begin at block 400 with the initiation of a primary path connection by an application executing on the host system 300 to establish a communication connection through the modem 310 to a remote server modem. A secondary connection is also set up for monitoring performance of the modem 310 through the bus interface 325 (block 405). In addition, acquisition of state information is begun utilizing the FIFO buffers 355, 360 to track the state of one or more state machines implemented within the modem 310 (block 410). The modem 310 typically includes a plurality of state machines each state machine having a plurality of associated states. The internal state information regarding the respective states is maintained by placement in the FIFO buffers 355, 360. In one embodiment, a respective one of FIFO buffers is associated with each of the different state machines of the modem 310.

Figure 4:
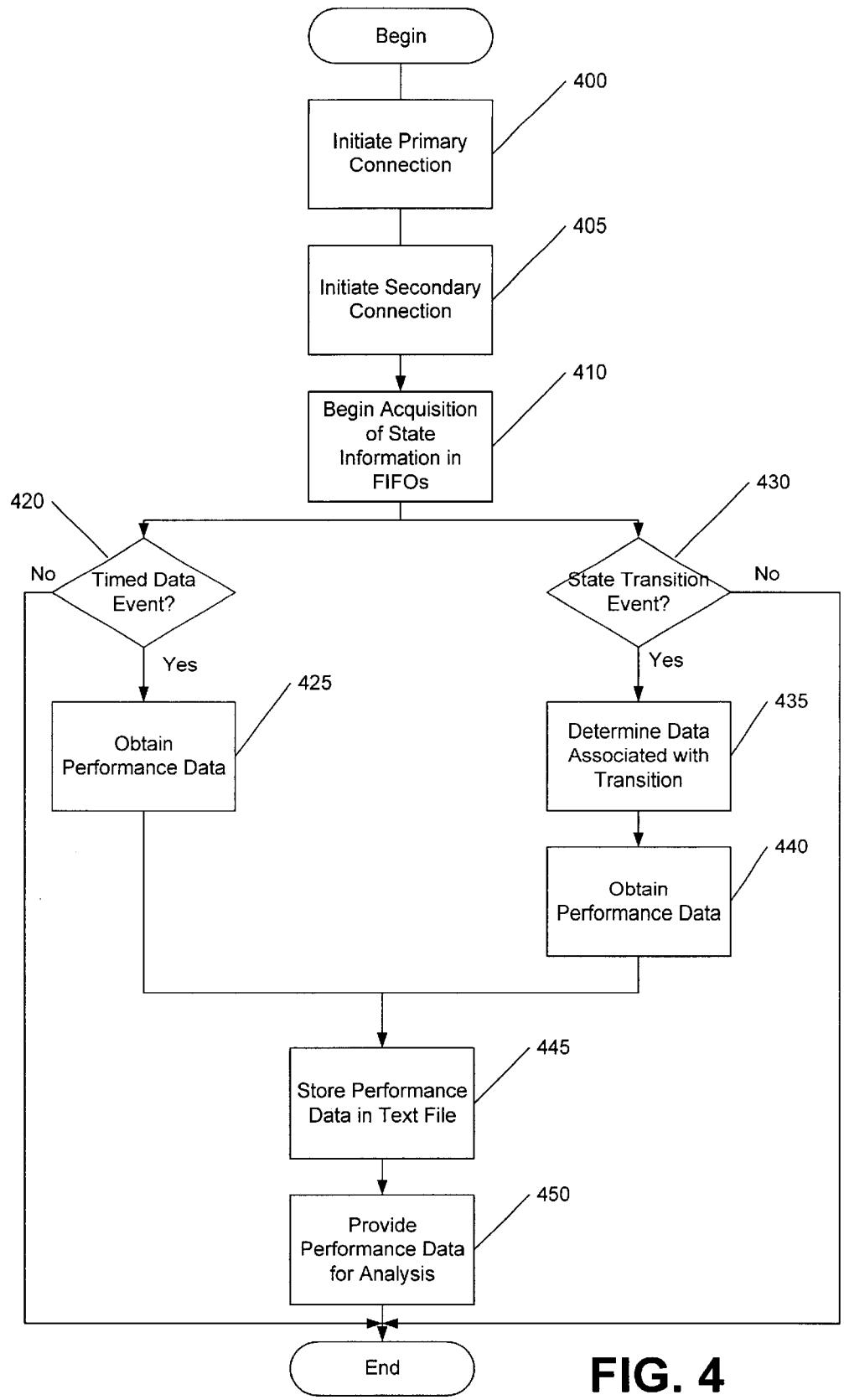
FIG. 4 is a flow chart illustrating operations for obtaining performance data according to an embodiment of the present invention.

As illustrated embodiment of FIG. 4, data collection is, in part, based on timed data events. Detection of a timed data event (block 420) results in the obtaining of performance

TABLE 1

| Type of Impairment | Illustrative Monitoring |
| --- | --- |
| Digital PAD Loss from Server to Client | dB measurement accurate to 3 decimal digits of precision and whether it is single or tandemn |
| Robbed Bit Signalling (RBS) from Server to Client and before the Digital PAD | all 6 intervals are identified so precise counts can be determined (DIL data also available) |
| Robbed Bit Signalling (RBS) from Server to Client and after the Digital PAD | all 6 intervals are identified so precise counts can be determined (DIL data also available) |
| Transhybrid Loss | precise echo canceller response is available to examine frequency dependent echo response |
| IMD 2nd Order | line probing reveals intermod. Estimates of distortion at 900, 1200, 1800, and 2400 Hz |
| Round Trip Delay | accurate to 1 millisecond |
| Analog PAD Loss | examination of the feedforward section of the equalizer, in conjunction with analysis of the digital PAD and analog AGC value, reveals the combined effect of loop length and analog PAD |
| Loop Noise | in the absence of significant nonlinear distortion, the MSE provides a good estimate of the noise |

The various impairments described in Table 1 above may further be combined with information related to various cable loop lengths for the connection. A combined channel response may then be estimated for the remote central office transfer function (including digital to analog post filtering) and, the transfer function of the local loop from the central office. The transfer function for the front end of the client modem 310 may further be determined. These various transfer functions may be estimated by capturing the decision feed back equalizer's coefficients from within the client modem 310 after equalizer training is completed. In addition, an approximation of these transfer function may be examined prior to equalizer training by examining a curve fitting error which fits various V.34 modulation and carrier data (block 425). For example, specified performance parameters, which may be obtained from the DSP memory 345, may be repeatedly obtained and stored on a periodic basis such as on a minute-by-minute basis during an active connection. In addition, a state transition event may be detected (block 430) which also results in the acquisition and storage of selected performance data. More particularly, when a state transition event is detected (block 430) the data associated with the occurring event is identified (block 435). The identified categories of performance data are then obtained (block 440). As illustrated at block 445, the obtained performance data from either block 425 or block 440 is then stored, preferably in a text file format (block 445).

As described previously with reference to FIG. 3, the obtained data related to the performance of the modem is obtained from the DSP memory 345 during an active connection of the modem 310 using a secondary path 335 to the DSP memory 345. The obtained data may correspond to startup phase operations or data communication portions of the active connection. The data related to the performance of the modem may be selected from line condition data, such as current mean squared error, current number of error events since the connection began, current data rates for transmit and receive and interworking data, such as remote retrain or rate renegotiation requests, remote modem brand identification, remote modem requests to go to error recovery during startup, retrain or rate renegotiation procedures, etc. Examples of such data in the context of a V.90 modem have been described more fully above with reference to the discussion of FIG. 3.

The state transition event is detected at block 430 based on internal state information obtained from the FIFO buffers 355, 360. For example, a state transition may be detected for one of the plurality of state machines of the modem 310 based on detecting a change from one of the plurality of associated states of the one of the plurality of state machines to another of the plurality of associated states of the one of the plurality of state machines. Furthermore, operations for determining the selected data to obtain at block 435 responsive to a state transition event may be based on the one of plurality of state machines which has undergone a state transition and may further be based upon the starting and ending states of the respective state transition for that one of the plurality of state machines.

In a preferred embodiment of the present invention, the performance data is stored at block 445 in two separate text output files. The first file is utilized for a global summary of the active connection with time interval (such as minute-by-minute) snap shots detailing the value of the various performance data obtained from the DSP memory 345. A second output file is preferably state machine focused and details the condition of the various state machines of the modem 310 and further includes any critical state variables and associated other performance data which is selected for capture based on particular state transitions.

The performance data files from block 445 may further be provided to a remote location for analysis (block 450). Accordingly, a manufacturer or service provider may remotely access diagnostic information suitable for analyzing problems and addressing user complaints. More particularly, connection specific information may be provided which may be particularly useful in light of the differences between line connections for various users in point to point connections thereby allowing the service provider to deal with individual cases to provide responsive support to individual users. It is further to be understood that the operations at blocks 420 through 450 may repeat throughout the duration of a connection as additional timed data events or state transition events are encountered or until monitoring operations are discontinued by a user.

In order to aid those of skill in the art to further understand the present invention, exemplary performance monitoring outputs in a two file format for an embodiment of the present invention as shown in Appendix A and Appendix B will now be described. Appendix A and Appendix B correspond respectively to the two output text file format described for a preferred embodiment above. More particularly, Appendix A is an output file which is state machine driven and details the state machines of a modem and identifies critical state variables that are captured based on state transitions. As shown in Appendix A, the respective state machines of the modem include four separate state machines: transmit (TX), receive (RX), front end transmit (FT) and front end receive (FR). The various states for each of the respective state machines correspond to operations in compliance with the V.90 standard and will be understood by those of skill in the art familiar with that standard. The first column indicates the time of occurrence of the state condition. The asterisks in the state machine columns indicate the state machine which underwent a transition triggering the creation of the row entry. The final column does not correspond to a state machine but reflects a data value for the current mean squared error (MSE) at the output of the equalizer which the exemplary protocol captures and records at each state transition. In addition, at various points in the state machine tracking text file of Appendix A, selected performance data values are captured responsive to particular state machine state transitions. For example, at the time 13: 23: 44, responsive to a transition of the RX state machine from a recv_J state to a recv_JP state, various equalizer and echo canceller related parameter values are captured. State transition triggered parameter capture is also reflected at times 13: 23: 47, 13:23: 49, 13:23:50, 13:23: 52 and 13: 23: 55.

The second text output file format is illustrated by the exemplary embodiment in Appendix B. Appendix B corresponds to a text file which is a global summary of a connection with details. As with the example of Appendix A, the terminology utilized in the example of Appendix B is consistent with that defined by the V.90 standard and will be understood by those of ordinary skill in the art. Prior to the power levels section is a list of a number of V.8 (phase 1) bytes from both the local and the remote modem. The power levels are self explanatory. The global minute by minute summary includes LMCPS (last minute characters per second) which shows the estimated average throughput of the modem during the last minute including the effects of retrains, rate renegotiations and line errors. SUMEE refers to the running sum of line errors that have taken place since the connection began. The remaining parameters are generally related to a particular ACP modem, the ThinkPad™ ACP modem, and may or may not be parameters found in other modem products.

The present invention has been described above with reference to the block diagram illustrations of FIG. 3. and the flowchart illustration of FIG. 4. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is to be understood that many variations and modifications can be made to the embodiments described herein above without substantially departing from the principles of the present invention. All such variations and modifications are intended to be included herein within the scope of the present invention, as set forth in the following claims.

We claim:

1. A method for monitoring performance of a modem comprising the steps of:

establishing an active communications connection utilizing the modem;

obtaining data related to the performance of the modem, including internal state information, from a digital signal processor (DSP) memory of the modem using a secondary path to the DSP memory which is separate and independent from a primary path to said DSP memory utilized in support of the communications connection;

determining that a state transition has occurred based on the internal state information; and capturing a selected type of data related to the performance of the modem responsive to a state transition.

2. A method according to claim 1 wherein the obtaining step further comprises the step of obtaining data related to the performance of the modem from the DSP memory during startup of the active connection.

3. A method according to claim 1 wherein the data related to the performance of the modem is selected from the group consisting of line condition data and interworking data.

4. A method according to claim 1 wherein the modem includes a plurality of state machines each state machine having a plurality of associated states and wherein the determining step further comprises the step of determining that a state transition of one of the plurality of state machines has occurred based on detecting a change from one of the plurality of associated states of the one of the plurality of state machines to another of the plurality of associated states of the one of the plurality of state machines and wherein the selected type of data is selected based on the one of the plurality of state machines.

5. A method according to claim 4 wherein the selected type of data is further selected based on the one of the plurality of associated states and the another of the plurality of associated states.

6. A method according to claim 1 wherein the determining step is preceded by the step of providing a first-in first-out (FIFO) buffer in the DSP memory and wherein the determining step further comprises the step of placing the internal state information in the FIFO buffer.

7. A method according to claim 6 wherein the providing step further comprises the step of providing a plurality of FIFO buffers in the DSP memory, each of the plurality of FIFO buffers being associated with a different state machine of the modem and wherein the placing step further comprises placing internal state information associated with a respective state machine of the modem in a corresponding one of the plurality of FIFO buffers.

8. A method according to claim 1 wherein the obtaining step is followed by the step of storing the data related to the performance of the modem in a text file.

9. A method according to claim 8 wherein the storing step is followed by the step of providing the stored data to a remote location for analysis.

10. A system for monitoring performance of a modem comprising:

a host system having a host system bus;

a modem, the modem including:
a digital signal processor (DSP);
a memory coupled to the DSP over a DSP system bus;
a primary path to the DSP memory that supports a communication connection;
a plurality of first-in first-out (FIFO) buffers coupled to the DSP, each of the FIFO buffers being associated with one of a plurality of state machines of the modem and
wherein the DSP is configured to place internal state information associated with the
plurality of state machines in a corresponding one of the FIFO buffers; and a bus interface coupling the host system bus to the DSP system bus, the bus interface being configured to allow the host system to access the DSP memory to obtain data related to performance of the modem during an active communication session supported by the primary path of the modem using a secondary path to the DSP memory which is separate and independent from the primary path to said DSP.

11. A system for monitoring performance of a modem comprising:

an interface coupled to the modem;

means for obtaining data related to the performance of the modem, including internal state information, from a digital signal processor (DSP) memory of the modem during an active connection to the modem using a secondary path to the DSP memory which is separate and independent from a primary path to said DSP memory utilized in support of the communications connection, the secondary path including the interface coupled to the modem;

means for determining that a state transition has occurred based on the internal state information; and means for capturing a selected type of data related to the performance of the modem responsive to a state transition.

12. A system according to claim 11 wherein the means for obtaining further comprises means for obtaining data related to the performance of the modem from the DSP memory during startup of the active connection.

13. A system according to claim 11 wherein the data related to the performance of the modem is selected from the group consisting of line condition data and interworking data.

14. A system according to claim 11 wherein the modem includes a plurality of state machines each state machine having a plurality of associated states and wherein the means for determining further comprises means for determining that a state transition of one of the plurality of state machines has occurred based on detecting a change from one of the plurality of associated states of the one of the plurality of state machines to another of the plurality of associated states of the one of the plurality of state machines and wherein the selected type of data is selected based on the one of the plurality of state machines.

15. A system according to claim 14 wherein the selected type of data is further selected based on the one of the plurality of associated states and the another of the plurality of associated states.

16. A system according to claim 11 wherein the system further comprises a first-in first-out (FIFO) buffer in the DSP memory and wherein the means for determining further comprises means for placing the internal state information in the FIFO buffer.

17. A system according to claim 16 wherein the means for providing further comprises means for providing a plurality of FIFO buffers in the DSP memory, each of the plurality of FIFO buffers being associated with a different state machine of the modem and wherein the means for placing further comprises means for placing internal state information associated with a respective state machine of the modem in a corresponding one of the plurality of FIFO buffers.

18. A system according to claim 11 further comprising means for storing the date related to the performance of the modem in a text file.

19. A system according to claim 18 further comprising means for providing the stored data to a remote location for analysis.

20. A computer program product for monitoring performance of a modem, comprising:
a computer readable storage medium having computer readable program code means embodied therein, the computer readable code means comprising:
computer readable code which establishes an active communications connection utilizing the modem;
computer readable code which obtains data related to the performance of the modem, including internal state information, from a digital signal processor (DSP) memory of the modem using a secondary path to the DSP memory which is separate and independent from a primary path to said DSP memory utilized in support of the communications connection;
computer readable code which determines that a state transition has occurred based on the internal state information; and
computer readable code which captures a selected type of data related to the performance of the modem responsive to a state transition.

21. A computer program product according to claim 20 wherein the computer readable code which obtains further comprises computer readable code which obtains data related to the performance of the modem from the DSP memory during startup of the active connection.

22. A computer program product according to claim 20 wherein the data related to the performance of the modem is selected from the group consisting of line condition data and interworking data.

23. A computer program product according to claim 20 wherein the modem includes a plurality of state machines each state machine having a plurality of associated states and wherein the computer readable code which determines further comprises computer readable code which determines that a state transition of one of the plurality of state machines has occurred based on detecting a change from one of the plurality of associated states of the one of the plurality of state machines to another of the plurality of associated states of the one of the plurality of state machines and wherein the selected type of data is selected based on the one of the plurality of state machines.

24. A computer program product according to claim 23 wherein the selected type of data is further selected based on the one of the plurality of associated states and the another of the plurality of associated states.

25. A computer program product according to claim 20 wherein the computer readable code which determines further comprises computer readable code which places the internal state information in a first-in first-out (FIFO) buffer in the DSP memory.

26. A computer program product according to claim 25 wherein the computer readable code which provides further comprises computer readable code which provides a plurality of FIFO buffers in the DSP memory, each of the plurality of FIFO buffers being associated with a different state machine of the modem and wherein the computer readable code which places further comprises computer readable code which places internal state information associated with a respective state machine of the modem in a corresponding one of the plurality of FIFO buffers.

27. A computer program product according to claim 20 further comprising computer readable code which stores the data related to the performance of the modem in a text file.

28. A computer program product according to claim 27 further comprising computer readable code which provides the stored data to a remote location for analysis.

* * * * *